United States Patent Office.

ADOLPH FRANK, OF CHARLOTTENBURG, GERMANY.

PROCESS OF MAKING CARBON PIGMENT.

SPECIFICATION forming part of Letters Patent No. 682,249, dated September 10, 1901.

Application filed June 26, 1899. Serial No. 721,936. (No specimens.)

*To all whom it may concern:*

Be it known that I, ADOLPH FRANK, a subject of the German Emperor, and a resident of Charlottenburg, Germany, have invented certain new and useful Improvements in Processes of Making Carbon; and I do hereby declare the following to be a full, clear, and exact description of the invention.

I have discovered that acetylene or mixtures or compounds containing acetylene are decomposed with separation of carbon when they are mixed with oxids of carbon, such as carbonic acid or carbon monoxid, or with gases containing these compounds, and the resultant mixture is conducted through heated tubes or subjected under pressure to the action of the electric spark. Under these conditions the gases react on each other according to the equations:

$$C_2H_2 + CO = H_2O + 3C.$$
$$2C_2H_2 + CO_2 = 2H_2O + 5C.$$
$$C_2H_2 + 3CO = H_2O + CO_2 4C.$$
$$C_2H_2 + CO_2 = H_2O + CO + 2C.$$

Instead of acetylene, metallic compounds thereof can also be advantageously employed, more especially the carbids of the alkaline earths or other carbids—for example, aluminium carbid—or mixtures containing these compounds. Consequently "carbid," using the word quite generally, (under which term, however, both hydrogen carbid, such as acetylene, as well also as metallic carbids, is to be here understood,) is capable of being employed. If, for example, carbon monoxid, carbonic acid, or gases containing these compounds be conducted over calcium carbid at an elevated temperature, separation of carbon is set up and mainly in accordance with the reactions:

$$CaC_2 + CO = CaO + 3C.$$
$$CaC_2 + 3CO = CaCO_3 + 4C.$$
$$2CaC_2 + CO_2 = 2CaO + 5C.$$
$$2CaC_2 + 3CO_2 = 2CaCO_3 + 5C.$$

The carbon separates in this reaction in proportion to the temperature employed and to the duration of the action in a state of more or less fine subdivision or in a crystalline form. As an example may be mentioned the manufacture of very finely divided carbon from calcium carbid.

In a retort, tube, or other suitable apparatus finely-divided calcium carbid is heated to a temperature of from 200° to 250° centigrade and subjected to the action of carbon monoxid for such a time that absorption no longer takes place. The reaction mass obtained is elutriated or washed with water and the elutriated or washed mass when necessary freed from adhering lime by treatment with suitable solvents. The carbon powder so obtained is free from all tarry constituents and is so finely divided that it can be advantageously employed in the manufacture of the best printing-ink and as a substitute for Chinese or "Indian" ink.

Having now particularly described my invention, what I claim, and desire to secure by Letters Patent, is—

1. The process for producing carbon, which consists in reacting on a carbid such as described, with an oxid of carbon, substantially as described.

2. The process for producing carbon, which consists in reacting on a carbid of a metal with an oxid of carbon, substantially as described.

3. The process for producing carbon, which consists in reacting on a carbid of the metals of the alkalies or alkaline earths with an oxid of carbon, substantially as set forth.

In testimony that I claim the foregoing as my invention I have signed my name in presence of two subscribing witnesses.

ADOLPH FRANK.

Witnesses:
  HENRY HASPER,
  WOLDEMAR HAUPT.

Correction in Letters Patent No. 682,249.

It is hereby certified that in Letters Patent No. 682,249, granted September 10, 1901, upon the application of Adolph Frank, of Charlottenburg, Germany, the title of the invention was erroneously written and printed "Processes of Making Carbon Pigments," whereas said title should have been written and printed *Processes of Making Carbon;* and that the said Letters Patent should be read with this correction therein that the same may conform to the record of the case in the Patent Office.

Signed, countersigned, and sealed this 17th day of September, A. D., 1901.

[SEAL.]

F. L. CAMPBELL,
*Assistant Secretary of the Interior.*

Countersigned:
    F. I. ALLEN,
        *Commissioner of Patents.*